United States Patent
Hopkins, Sr.

(10) Patent No.: US 7,034,268 B2
(45) Date of Patent: Apr. 25, 2006

(54) SELF-VENTING MICROWAVE COOKING CONTAINER FOR USE WITH A VERTICAL FILL AUTOMATED MACHINE

(75) Inventor: Gary L. Hopkins, Sr., Scottsburg, IN (US)

(73) Assignee: Steamway Franchise Sales, Inc., Scottsburg, IN (US)

( * ) Notice: Subject to any disclaimer, the term of this patent is extended or adjusted under 35 U.S.C. 154(b) by 0 days.

(21) Appl. No.: 10/825,276

(22) Filed: Apr. 13, 2004

(65) Prior Publication Data

Related U.S. Application Data

(60) Provisional application No. 60/462,751, filed on Apr. 14, 2003, provisional application No. 60/469,155, filed on May 9, 2003.

(51) Int. Cl.
*H05B 6/80* (2006.01)
*B65D 51/16* (2006.01)

(52) U.S. Cl. ..................... 219/735; 220/360

(58) Field of Classification Search ............. 219/735, 219/757, 730, 731, 732, 733, 734; 220/360, 220/203.01, 366.1
See application file for complete search history.

(56) References Cited

U.S. PATENT DOCUMENTS

| | | | |
|---|---|---|---|
| 5,521,361 A * | 5/1996 | Strait, Jr. ................... 219/731 |
| D378,178 S * | 2/1997 | Sawyer ..................... D7/359 |
| 5,750,967 A * | 5/1998 | Sprauer, Jr. ................. 219/735 |
| D420,584 S * | 2/2000 | Hopkins ..................... D9/423 |
| D433,592 S | 11/2000 | Hopkins |
| 6,187,354 B1 | 2/2001 | Hopkins |
| 6,309,684 B1 | 10/2001 | Hopkins |
| 6,559,431 B1 | 5/2003 | Hopkins |
| D475,571 S | 6/2003 | Hopkins |
| 6,615,985 B1 * | 9/2003 | Foreman ..................... 206/485 |
| 6,660,983 B1 * | 12/2003 | Monforton et al. ......... 219/727 |
| D487,971 S * | 4/2004 | Bergeron et al. ........... D3/313 |
| 6,847,022 B1 | 1/2005 | Hopkins |

* cited by examiner

*Primary Examiner*—Daniel Robinson
(74) *Attorney, Agent, or Firm*—Carrtthers Law Office PLLC; David W. Carrithers

(57) ABSTRACT

A self-venting microwave cooking container for use with a vertical fill automated machine generally comprises a bag portion, a tray portion, and a venting configuration. The bag portion defines an opening for receiving a food product from a vertical fill automated machine, and the tray portion includes a floor having a surface for supporting the food product. Once the food has been delivered to the container, the opening is sealed, and the food product is maintained within the container and ready for subsequent cooking in a microwave oven.

4 Claims, 4 Drawing Sheets

SELF-VENTING MICROWAVE COOKING CONTAINER FOR USE WITH A VERTICAL FILL AUTOMATED MACHINE

CROSS REFERENCES TO RELATED APPLICATIONS

This application claims priority from U.S. Provisional Application Ser. No. 60/462,751 filed Apr. 14, 2003 and U.S. Provisional Application Ser. No. 60/469,155 filed May 9, 2003, the entire disclosures of which are incorporated herein by this reference.

FIELD OF THE INVENTION

The present invention relates to the field of cooking devices, and, more particularly, to cooking containers for use in a microwave oven to cook meats, vegetables, and other food products.

BACKGROUND OF THE INVENTION

Consumers often prefer to cook food in a microwave oven rather than conventional ovens because of the reduced cooking time required to heat foods in a microwave oven. Consumers also want to be provided with the opportunity to cook pre-packaged food products in the package in which they were purchased without the hassle of transferring the food from one container to the next. Unfortunately, however, foods cooked in a microwave oven tend to be tough and/or dry in texture and consistency, rather than tender and moist. When liquid is added to the food in an attempt to retain moisture, the food can become soggy and undesirable. In addition, microwave ovens do not evenly distribute heat to the product being cooked. This results in a cooked food product that may be very hot in one area, but cold in another area. Because of these problems, many people consider microwave cooking to be problematic and generally undesirable.

One method for improving the texture and consistency of food cooked in a microwave oven is to use steam generated by the heated food product to assist in cooking the food. Cooking with steam not only provides moisture for the food being cooked, but also results in more consistent heating throughout the food product. In order to steam cook a food product in a microwave oven, the steam must be retained within a cooking container; accordingly, the container must be at least partially sealed. When a sealed container is used to heat a food product contained therein, pressure rapidly builds as steam is generated from the heated food product. As heating continues, this pressure will continue to escalate until the container's seal is broken, thereby relieving the pressure. This relief often comes in the form of an explosion forcing the covering from the base of the container, resulting in food being ejected from the container. Not only does such an explosion create a mess, but it also undermines the attempt to use steam to cook the food product because the explosion causes a rapid release of the collected steam from the no longer sealed cooking environment.

The release of pressure can be controlled by including one or more vents in the container. These vents create a weakened portion in the seal between the container's covering and its base. When the sealed cooking environment attains a pressure creating a risk of explosion, the weakened portions in the seal allow for a controlled pressure release at the vents. The seal between the container's covering and its base is broken at the point where the pressure release occurs, creating a tab which may be grasped or otherwise used to pull the covering from the base, breaking the remainder of the seal such that consumption of the food product may occur. Such venting configuration is described in commonly assigned U.S. Pat. No. 6,559,431, which is incorporated in its entirety herein by reference.

Such self-venting containers have a variety of applications in the field of food storage and preparation; however, one of their limitations is the lack of compatibility with vertical fill automated machines. A vertical fill automated machine is commonly used to deliver food product to a storage bag. These automated machines have the capacity to fill numerous storage bags at a very rapid rate, making them popular devices in the food packaging industry. Because traditional food-storage bags filled by a vertical fill automated machine lack the enhanced cooking benefits of the self-venting containers described above, food products that have been stored in and thereafter cooked in such storage bags typically lack desirable texture and consistency.

Accordingly, there remains a need in the art for a cooking container which satisfactorily addresses the needs of cost and time-conscious parties in the food packaging industry and consumers of microwaveable food products.

SUMMARY OF THE INVENTION

The present invention meets the above identified needs, and others, by providing a microwave cooking container that is compatible with a vertical fill automated machine and provides a self-venting system for steam cooking in a microwave oven, resulting in a prepared food product of a desirable texture and consistency. Specifically, a microwave cooking container made in accordance with the present invention includes a bag portion, a tray portion, and a venting configuration. It is contemplated that the bag portion may be constructed from a flexible material, such as polypropylene film, while the tray portion may be constructed from a more rigid material, such as food-grade plastic.

The bag portion of the container defines an opening for receiving food product, and the tray portion includes a surface for supporting the food product. The container has an overall shape that allows it to be loaded into and used with a standard vertical fill automated machine, as is commonly used in the food storage and preparation industry. The vertical fill automated machine is used to deliver food product to the container through the opening and thereafter seal the opening, such that the integrity of the food product within the container is maintained during storage and until the food product is prepared for consumption.

It is contemplated that the strength and degree of adhesive power of the seal used to close the opening are sufficient to maintain the integrity of the food product held within the container until it is prepared for consumption. Accordingly, additional external packaging, such as a cardboard sleeve or box, is not necessary to maintain the integrity of the packaging. It is further contemplated that the container may be constructed from a material capable of being printed with high-quality graphics, such as polypropylene. Accordingly, external packaging is not necessary to display graphics and information about the product contained therein. As such, the need for external packaging is eliminated, reducing the overall cost of producing the container and reducing the amount material thrown away following consumption of the food product.

The microwave cooking container uses a steam cooking method to prepare the food product. Such method is described in commonly assigned U.S. Pat. No. 6,559,431, which has been incorporated herein by reference. Briefly, the container is designed to maintain a constant volume until the pressure from the steam increases to a point that it causes venting to occur. Because the volume remains constant until venting occurs, the steam-induced pressure builds within the closed volume. The heightened pressure resulting from the presence of the trapped steam causes the temperature within the container to increase above a temperature able to be achieved at ambient pressures. Steam cooking using the container thus results in more consistent heating throughout the food product, faster preparation time, and an end product with desirable texture and consistency. Furthermore, as mentioned above, the container includes a venting configuration, which is designed to facilitate controlled venting of the container at a predetermined location, for example, along the seal of the opening or at a weakened area of the bag portion.

Furthermore, because different foods have different textures and moisture contents, the same pressure is not ideal for cooking all types of foods. With this in mind, it is contemplated that the container be capable of customization for creating an optimal cooking environment for the type of food product contained therein.

DETAILED DESCRIPTION OF THE INVENTION

Figure 1:
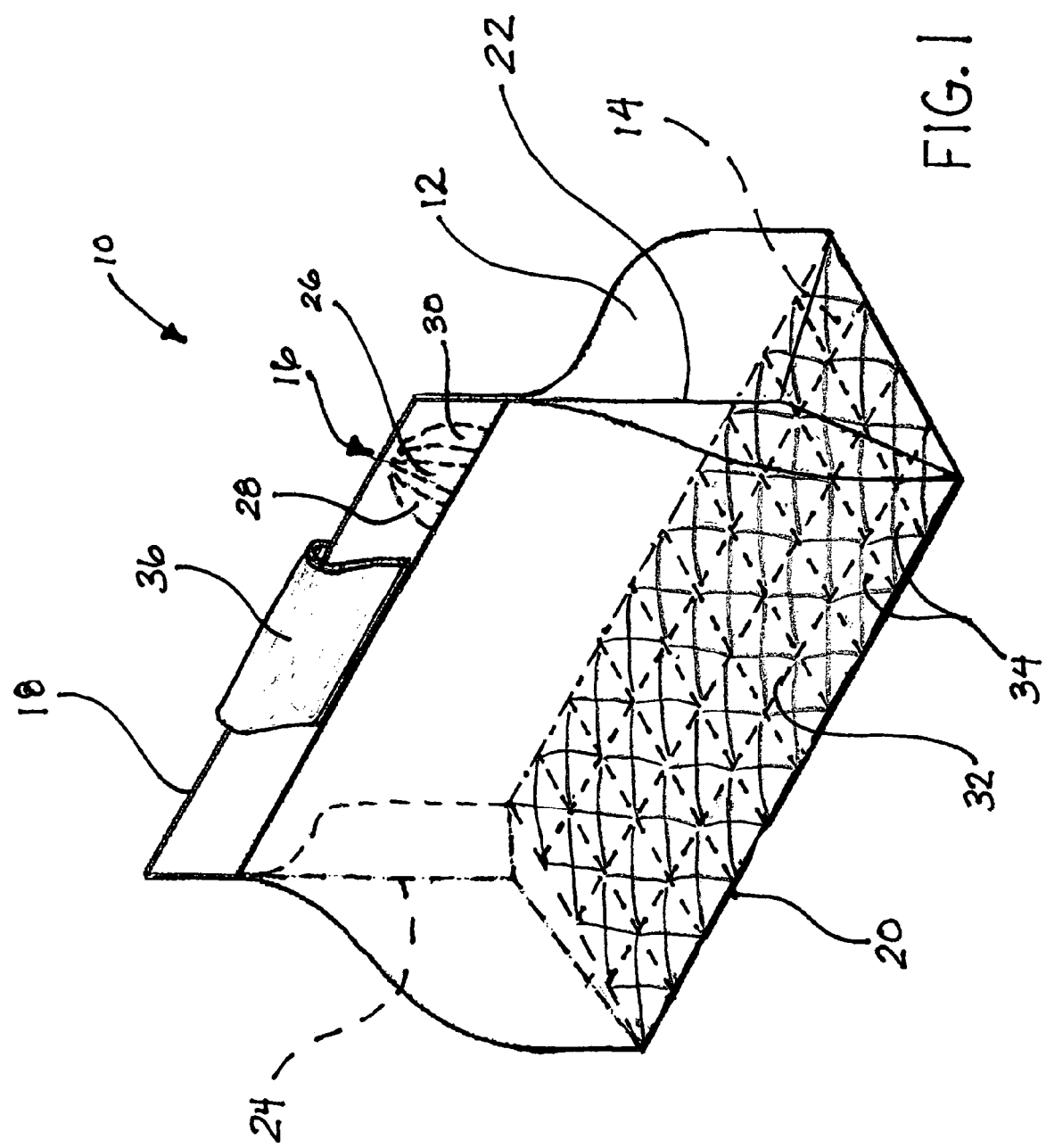
FIG. 1 is a perspective view of an exemplary embodiment of a self-venting microwave cooking container made in accordance with the present invention.

The present invention is a self-venting microwave cooking container for use with a vertical fill automated machine. With reference to FIG. 1, an exemplary embodiment of a microwave cooking container 10 made in accordance with the present invention generally includes a bag portion 12, a tray portion 14, and a venting configuration 16. In this exemplary embodiment, the bag portion 12 is constructed from a polypropylene film, but could certainly be constructed from other materials (e.g., retortable film or susceptor film) without departing from the spirit and scope of the present invention. Similarly, in this exemplary embodiment, the tray portion 14 is made of a more rigid, food-grade polypropylene, but could also be constructed from other materials (e.g., cardboard) without departing from the spirit and scope of the present invention.

The bag portion 12 generally defines an opening 18 for receiving food product and a floor 20 for receiving the tray portion 14. In the exemplary embodiment shown in FIG. 1, the opening 18 for receiving food product is located along the upper edge of the bag portion 12. Of course, the opening 18 may be located at an alternative location without departing from the spirit and scope of the invention. For example, the opening 18 could be located on one side of the bag portion 12.

In any event, the container 10 has an overall shape that allows it to be loaded into and used with a standard vertical fill automated machine as is commonly used in the food storage and preparation industry. The vertical fill automated machine is used to deliver food product to the container 10 through the opening 18 and thereafter seal the opening 18, such that the integrity of the food product within the container 10 is maintained during storage and until the food product is prepared for consumption. It is contemplated that the opening 18 be sealed using a heat seal; however, a variety of sealing methods could be used, for example, a food-grade adhesive, without departing from the spirit and scope of the invention. It is further contemplated that a vacuum could be drawn on the contents of the container 10 prior to sealing the opening 18. Additionally, and as depicted in FIG. 1, to streamline the shape of the container 10 for packaging or storage, the container 10 could be folded. In so doing, creases 22, 24 are formed, and the parts of the bag portion 12 situated on either side of these creases 22, 24 can be brought towards and placed into contact with one another. In this manner, the container 10 can be placed in a compact orientation around the food product contained therein.

With respect to the sealing of the bag portion 12, it is contemplated that the strength and degree of adhesive power of the seal used to close the opening 18 is sufficient to maintain the integrity of the food product held within the container 10 until it is prepared for consumption. Accordingly, additional external packaging, such as a cardboard sleeve or box, is not necessary to maintain the integrity of the packaging. In addition to providing protection for its contents, external packaging typically serves to displays graphics and information about the product contained therein. In this regard, by constructing the bag portion 12 from a material capable of being printed with high-quality graphics, such as polypropylene, the need for external packaging can be eliminated. By so eliminating the need for external packaging, the overall cost of producing the container 10 is reduced, and there is less material to dispose of following consumption of the food product, making the container 10 environmentally friendly.

Once the food product has been sealed within the bag portion 12 and then acquired by a consumer, the container 10 can be placed in a microwave oven for cooking the food product. In this regard, steam generated by the heated food product is used to assist in cooking the food product, taking advantage of the ideal gas law, a distillation of several kinetic theories including Boyle's Law and Gay-Lussac's Law. More specifically, the present invention takes advantage of the proportional relationship between pressure and temperature when volume and number of gas molecules remain constant. This proportional relationship can be expressed as a mathematical equation, $(P2/P1)=(T2/T1)$, where PI is the initial pressure, P2 is the final pressure, T1 is the initial temperature, and T2 is the final temperature. Accordingly, any increase in pressure will result in a proportional increase in temperature that would not occur at ambient pressures. For example, if the pressure was to increases 1.2 fold (e.g., from 1 to 1.2 atmospheres), the temperature would also increase 1.2 fold (e.g., from 275 K to 330 K, which is an increase from 35° F. to 134° F.). Such a steam cooking method is described in commonly assigned U.S. Pat. No. 6,559,431, which has been incorporated herein by reference.

Referring still to the exemplary embodiment of the microwave cooking container 10 depicted in FIG. 1, a constant volume is maintained within the container until the pressure from the steam increases to a point that it causes the seal of the opening 18 to break and vent steam. Because the volume remains constant until venting occurs, the pressure within the container 10 increases as the moisture from the food product creates steam as it approaches its boiling point. The heightened pressure resulting from the presence of the trapped steam causes the temperature within the container 10 to increase above a temperature able to be achieved at ambient pressures. Steam cooking using the container 10 thus results in more consistent heating throughout the food product, faster preparation time, and an end product with desirable texture and consistency.

In the exemplary embodiment depicted in claim 1, a controlled venting is achieved by a venting configuration 16 along the seal of the opening 18. Generally, the venting configuration 16 creates a weakened portion in the seal and urges that weakened portion of the seal to break when a certain pressure is achieved within the container 10. In so doing, the venting configuration 16 limits the possibility that venting will occur elsewhere.

As described in detail in co-pending and commonly assigned U.S. patent application Ser. No. 10/729,787, which is incorporated herein by reference, the depicted venting configuration 16 comprises at least one steam guide 26 and an associated pair of steam horns 28, 30. The steam guide 26 is a substantially V-shaped pocket along the seal of the opening 18 with the "V" ending before the upper edge of the seal, the pocket being in fluid communication with the interior of the container 10. The steam horns 28, 30 are positioned on either side of the steam guide 26. Each steam horn 28, 30 is also a pocket along the seal of the opening 18 ending before the edge of the seal, the pockets being in fluid communication with the interior of the container 10. It is preferred that each steam horn 28, 30 have a curved shape that is angled toward the tip of the guide 26.

As mentioned above, when the food product in the container 10 is prepared for consumption, the moisture from the food product creates steam as it approaches its boiling point. The steam generated causes the pressure within container 10 to increase. As the pressure continues to build, the guide 26 directs the steam and pressure to its tip. Likewise, the steam horns 28, 30, which are angled inward toward the tip of the guide 26, direct the steam and pressure toward the tip of the guide 26. Thus, the pressure is heavily concentrated at the tip of the guide 26, causing the venting to occur at this predetermined location.

Furthermore, because different foods have different textures and moisture contents, the same pressure is not ideal for cooking all types of foods. With this in mind, it is contemplated that the container be capable of customization for creating an optimal cooking environment for the type of food product contained therein. In this regard, the venting configuration 16 can be used to customize the cooking environment of the container 10. For example, the angle of the pair of steam horns 28, 30 may be varied such that their tips terminate at points of various distances from the tip of the associated guide 26, thus allowing the concentration of pressure to be directed over various widths. By changing the width of the concentration of pressure, different internal pressures can be achieved and the length of cooking time occurring prior to venting can be controlled.

Of course, other venting configurations could also be used without departing from the spirit and scope of the present invention. For example, a weakened portion could be created on the container 10 by bringing a portion thereof into contact with a heat press. Additionally, a weakened portion could be created by varying the adhesive power in a portion of the seal used to close the opening 18. Alternatively, small pin holes (not shown) could be provided in the creases 22, 24 of the container 10. When the container 10 is in a compact orientation, the sections of the bag portion 12 situated on either side of each crease 22, 24 are folded towards and contact one another, thereby blocking the pin holes contained within the creases 22, 24 until the pressure from the steam increases to a point that it forces the container 10 from its compact orientation allowing venting through the pin holes to occur. For yet another example, a small pin hole (not shown) may be placed in the container 10 and covered with a steam patch (not shown), which is sealed to the container 10. As the pressure from the steam increases during cooking, it will eventually cause the seal of the patch to break away from the container 10 allowing venting to occur.

With respect to the customization of the container 10 to create an optimal cooking environment, it is also contemplated that the tray portion 14 may be specifically designed to create an optimal cooking environment for a particular type of food product. In this regard, the tray portion 14 includes an food supporting surface 32 provided with a floor pattern which is selected to create an optimal cooking environment for a particular type of food product held within the container 10. Although not shown in FIG. 1, the tray portion 14 may include one or more side walls (not shown) along its perimeter and extending upwardly therefrom for retaining the food product. In any event, it has been found that certain floor patterns provide better steam cooking environments for certain types of foods. For example, a flat floor is good for foods with a high sugar content, such as desserts. For another example, as depicted in FIG. 1, a floor comprising a plurality of pyramid-shaped projections 34 raised therefrom provides a good cooking environment for foods with heavy sauces. For yet another example, a floor including a plurality of rib projections (not shown) raised from the bottom surface allows solid proteins, such as chicken or fish, to achieve excellent texture and consistency when steam cooked in a microwave oven. For still yet another example, a floor having a plurality of sinusoidal projections (not shown) raised therefrom creates a good environment for foods without sauces such as plain vegetables. Of course, many other raised floor patterns can be contemplated. Additionally, the height of the provided projections may be altered to customize the cooking environment.

Finally, in the embodiment depicted in FIG. 1, an insulating handle 36 is included to provide protection from heat-related injury when the container 10 is grasped and removed from the microwave oven following preparation of the food product. The insulating handle 36 may be constructed from a strip of corrugated cardboard with adhesive material on one side, which may be folded over the sealed opening 18 of the container 10 and secured thereto with the adhesive material. Of course, the handle 36 may be made of any material suitable for providing insulation from heat and may be secured to the container 10 by an suitable means without departing from the spirit and scope of the present invention.

Figure 2:
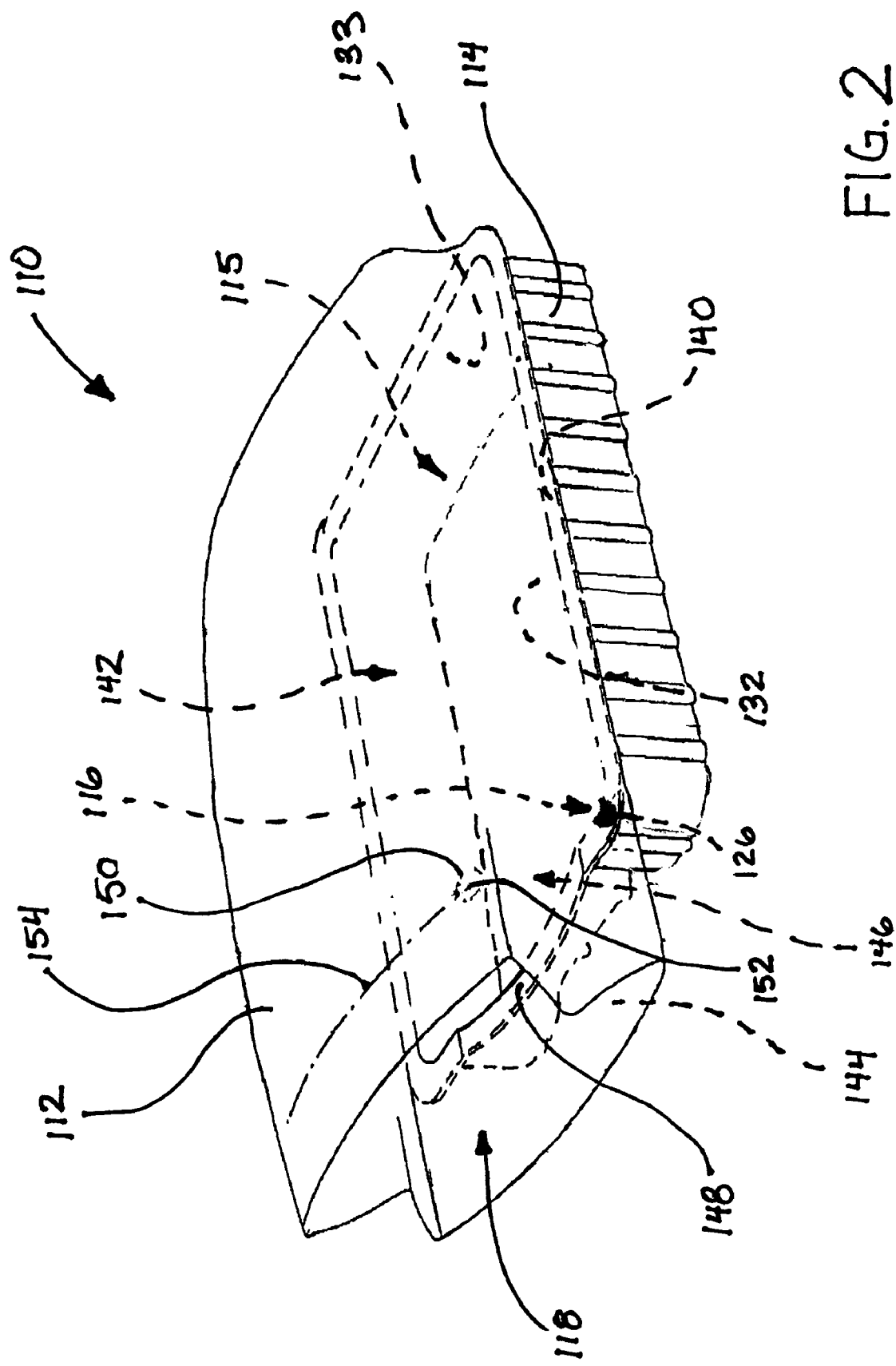
FIG. 2 is a perspective view of another exemplary embodiment of a self-venting microwave cooking container made in accordance with the present invention.

Referring now to FIG. 2, another exemplary embodiment of a microwave cooking container 110 made in accordance with the present invention is shown and includes a bag portion 112, a tray portion 114 with at least one compartment 115 for holding food product, and a venting configuration 116. Similar to the embodiment described above with respect to FIG. 1, in this exemplary embodiment, the bag portion 112 is constructed from a polypropylene film or similar material (e.g., retortable film or susceptor film), and the tray portion 14 is made of a more rigid, food-grade polypropylene or similar material (e.g., cardboard).

The tray portion 114 of this microwave cooking container 110 has a bottom surface 132 with a continuous side wall 133 extending therefrom and terminating in an upper rim 140 that is in a plane substantially parallel to the bottom surface 132 of the tray portion 114. The upper rim 140 circumscribes the opening 142 into the interior of the tray portion 114.

The bag portion 112 of this microwave cooking container 110 also defines an opening 118 for receiving food product at one end. In addition, the bottom side 144 of the bag portion 112 defines a lower opening 146 that is substantially the same size and shape as the opening 142 into the interior of the tray portion 114. The bottom side 144 of the bag portion 112 can thus be joined to the upper rim 140 of the tray portion 114, with the lower opening 146 of the bag portion 112 substantially in registry with the opening 142 into the interior of the tray portion 114. For example, the bag portion 112 could be joined to the tray portion 114 using a weld seal, thereby creating a sturdy bond for maintaining the integrity of the contents of the container 110. Of course, the bag portion 112 could be also attached to the tray portion 114 using a variety of methods, for example, using food-grade adhesive, without departing from the spirit and scope of the invention.

Referring still to FIG. 2, in this exemplary embodiment, the side wall 133 of the tray portion 114 includes a recessed area 148 adjacent the opening 118 defined by the bag portion 112, such that the rim 140 has a substantially concave segment. The recessed area 148 results in an enlarged opening 118 into the interior of the container 110, thereby facilitating the delivery of food product into the container 110. In the embodiment depicted in FIG. 2, the opening 118 is located on one side of the container 10. Of course, the opening 118 may be located anywhere along the rim 140 without departing from the spirit and scope of the invention.

As with the embodiment described above with reference to FIG. 1, the container 110 uses steam to assist in cooking the food product. Accordingly, the container 110 includes a venting configuration 116 that allows the volume of the container 110 to remain constant until the pressure from the steam generated while the food product is being cooked increases to a point that it causes the container 110 to vent. The venting configuration 116 depicted in FIG. 2 includes a steam guide 126 positioned adjacent a weakened area 150 of the bag portion 112. It is contemplated that this weakened area 150 is created by bringing a segment of the bag portion 112 into contact with a heat press. Of course, a weakened portion in the bag portion 112 could be created by alternative means, for example, limiting the degree of adhesive power in a portion of the seal used to close the opening 118. Venting occurs when pressure is directed toward the steam guide 126, eventually causing the bag portion 112 to break at the weakened area 150 adjacent the steam guide. When this action occurs, a tab 152 is created. In this regard, the embodiment additionally includes a substantially linear weakened area 154 trailing from the tab 152. The tab 152 may be grasped and pulled in the direction of the linear weakened area 154 to facilitate access to the prepared food product.

Of course, as with the embodiment described above with reference to FIG. 1, the exemplary microwave cooking container depicted in FIG. 2 could incorporate any of a number of venting configurations without departing from the spirit and scope of the present invention. Additionally, the embodiment depicted in FIG. 2 may be customized to create an optimal cooking environment for the type of food product contained therein in the same manner described above with reference to FIG. 1.

Figure 3:
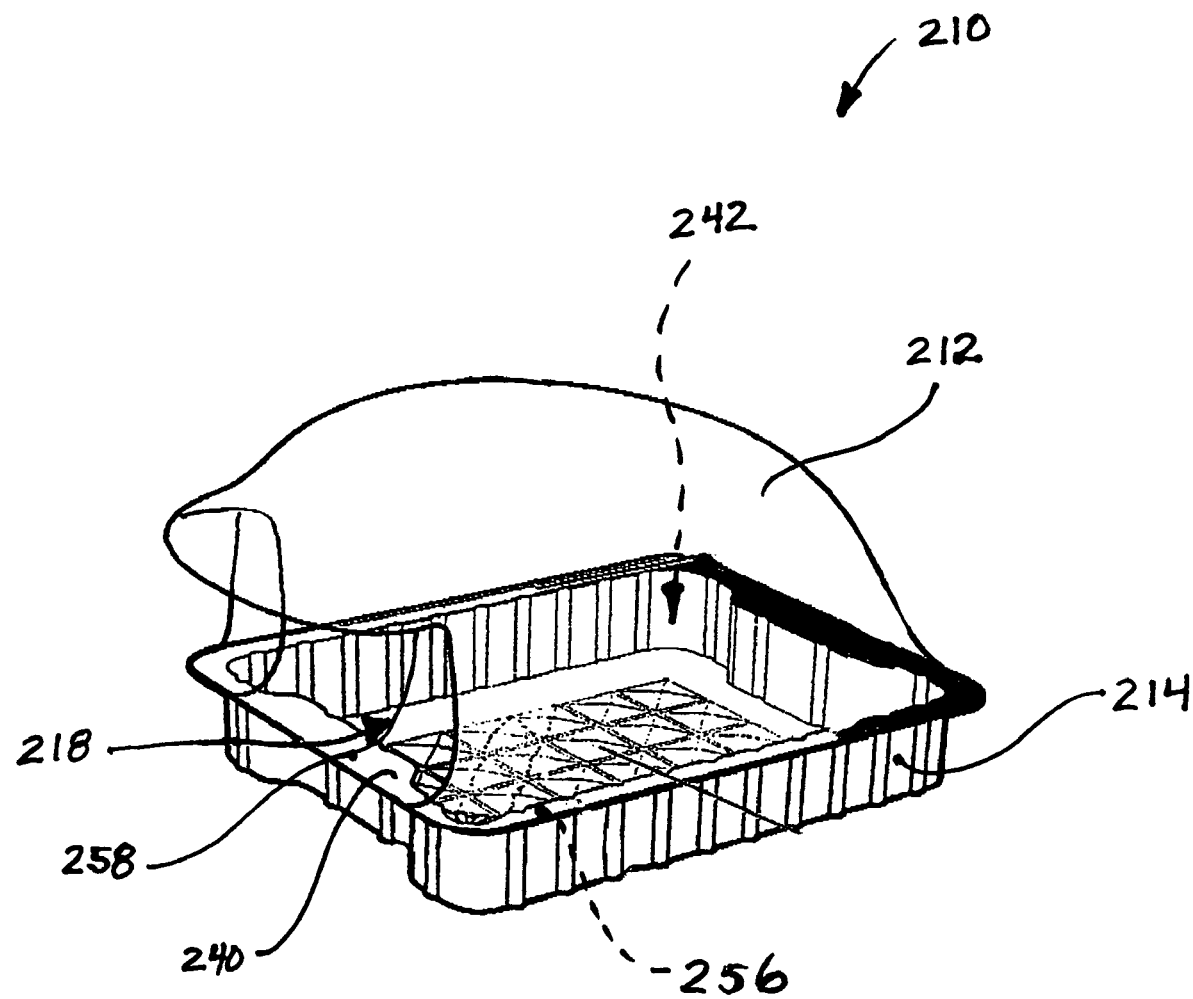
FIG. 3 is a perspective view of yet another exemplary embodiment of a self-venting microwave cooking container made in accordance with the present invention.

FIG. 3 is a perspective view of yet another exemplary embodiment of a self-venting microwave cooking container 210 made in accordance with the present invention. This particular container 210 is very similar to that depicted in FIG. 2, but has a bag portion 212 generally having the same geometrical shape as the opening 242 into the interior of the tray portion 214. A seal can then be created along the lower periphery 256 of the bag portion 212 and the upper rim 240 of the tray portion 214, such that an opening 218 for receiving food product remains between the upper rim 240 of the tray portion and the unsealed section 258 of the bag portion 212.

Figure 4:
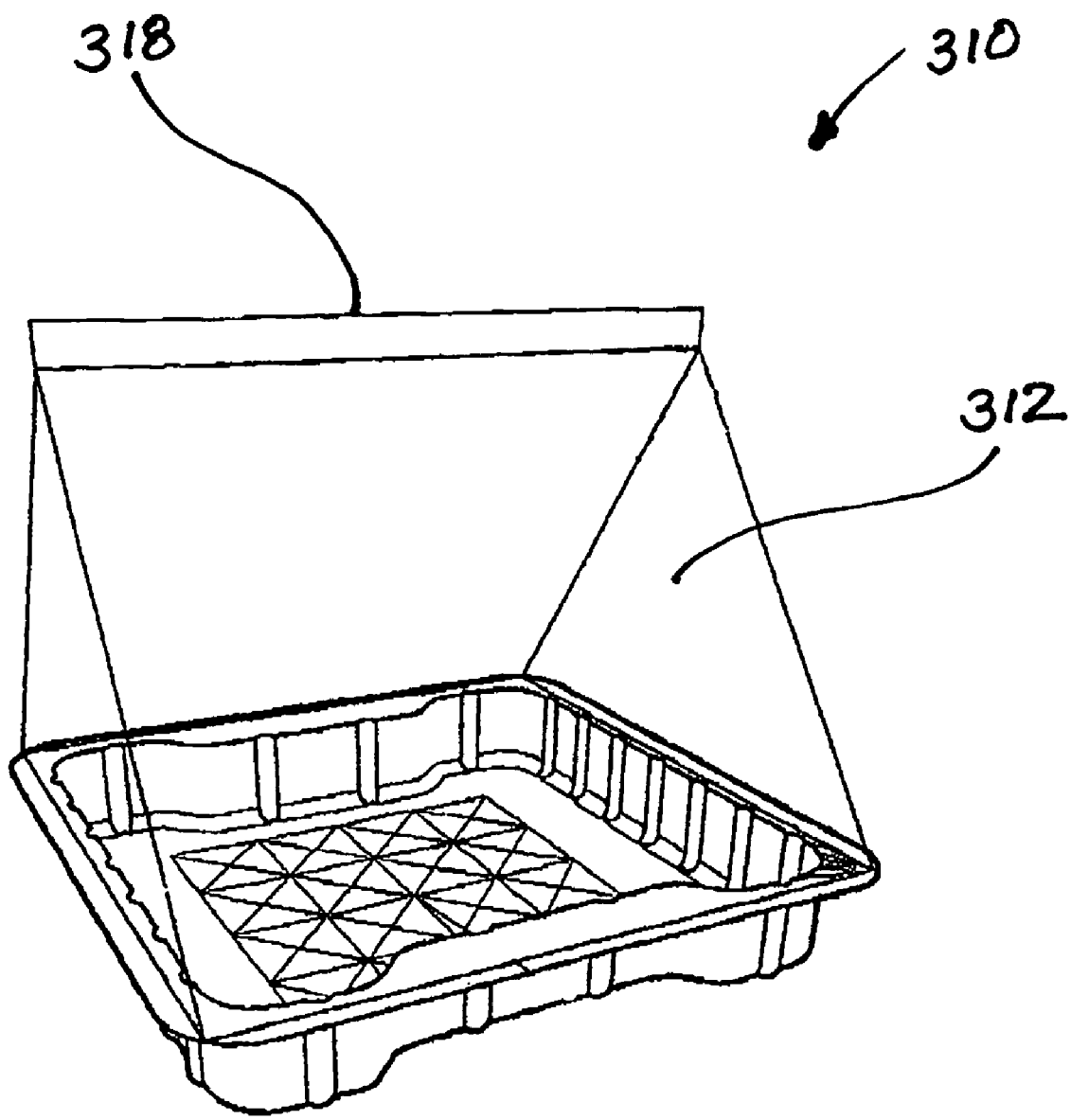
FIG. 4 is a perspective view of still another exemplary embodiment of a self-venting microwave cooking container made in accordance with the present invention.

Lastly, FIG. 4 is a perspective view of still another exemplary embodiment of a self-venting microwave cooking container 310 made in accordance with the present invention. In this exemplary embodiment, the opening 318 of the bag portion 312 is located at the top of the container 310.

It will be obvious to those skilled in the art that other modifications may be made to the invention described herein without departing from the spirit and scope of the present invention.

The invention claimed is:

1. A self-venting microwave cooking container for use with a vertical fill automated machine, comprising:
   a tray portion having a bottom surface and a side wall extending therefrom and terminating at an upper rim that is in a plane substantially parallel to the bottom surface of said tray portion, said upper rim circumscribing an opening into the interior of the tray portion;
   a bag portion defining an opening for receiving food product at one end, said bag portion also defining a lower opening that is substantially the same size and shape as the opening into the interior of the tray portion, allowing a bottom side of the bag portion to be joined to the upper rim of the tray portion, with the lower opening of the bag portion substantially in registry with the opening into the interior of the tray portion; and
   a venting configuration in fluid communication with a volume enclosed within said tray portion and said bag portion;
   wherein the opening into the bag portion is sealed after the food product has been received by said container for subsequent cooking of the food product in the container, and
   wherein said venting configuration causes preferential venting at a predetermined location when the food product is cooked in said container.

2. A self-venting microwave cooking container for use with a vertical fill automated machine, comprising:
   a tray portion having a bottom surface and a side wall extending therefrom and terminating at an upper rim that is in a plane substantially parallel to the bottom surface of said tray portion, said upper rim circumscribing an opening into the interior of the tray portion;
   a bag portion defining an opening for receiving food product at one end, said bag portion also defining a lower opening that is substantially the same size and shape as the opening into the interior of the tray portion, allowing a bottom side of the bag portion to be joined to the upper rim of the tray portion, with the lower opening of the bag portion substantially in registry with the opening into the interior of the tray portion; and a venting configuration in fluid communication with a volume enclosed within said tray portion and said bag portion;

wherein the opening into the bag portion is sealed after the food product has been received by said container for subsequent cooking of the food product in the container, wherein said venting configuration causes preferential venting at a predetermined location when the food product is cooked in said container; and at least one steam guide defining an indentation along the upper rim of said tray portion and being positioned adjacent a weakened area of said bag portion, such that, when said container is heated, steam and pressure are directed towards the tip of said at least one steam guide, causing pressure to be concentrated adjacent the weakened area of said bag portions, resulting in the bag portion being preferentially broken at the weakened area.

3. The microwave cooking container as recited in claim 2, wherein a tab is crated when the weakened area of said bag portion is broken, said bag portion additionally including a second weakened area, trailing substantially linearly from the tab, such that the tab may be grasped and pulled in the direction of the second weakened area to facilitate access to the food product.

4. The microwave cooking container as recited in claim 1, wherein said venting configuration comprises:

at least one steam guide defining an indentation along the upper rim of said tray portion and being positioned adjacent a weakened area of said bag portion, such that, when said container is heated, steam and pressure are directed towards the tip of said at least one steam guide, causing pressure to be concentrated adjacent the weakened area of said bag portions, resulting in the bag portion being preferentially broken at the weakened area.

* * * * *